United States Patent Office 3,220,972
Patented Nov. 30, 1965

3,220,972
ORGANOSILICON PROCESS USING A CHLORO-PLATINIC ACID REACTION PRODUCT AS THE CATALYST
Harry F. Lamoreaux, Schenectady, N.Y., assignor to General Electric Company, a corporation of New York
No Drawing. Filed July 2, 1962, Ser. No. 207,076
12 Claims. (Cl. 260—46.5)

The present invention relates to an improved process for the addition of a compound containing a silicon-hydrogen linkage across the multiple bonds of a compound containing aliphatic unsaturation to form a product containing new silicon-carbon linkages and to a catalyst for accomplishing this result.

It is well known in the field of organosilicon chemistry that desirable products can be prepared by the addition of compounds containing silicon-hydrogen linkages across the multiple bonds of other organic compounds containing aliphatic unsaturation, either olefinic or acetylenic. This reaction is generally illustrated by the following general equation:

(1) 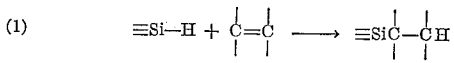

Reaction of the type described above have been carried out in the absence of catalysts or in the presence of catalysts. With some reactions it is possible to effect the addition reaction without any catalyst, employing heat alone or both heat and pressure to effect the addition. In other cases, the addition proceeds only in the presence of a catalyst and among the catalysts which have been suggested in the art are organic peroxides, metals such as palladium and platinum and platinum-containing materials such as chloroplatinic acid. Depending on the particular reaction involved, this addition has been accomplished with varying degrees of success. For example, the addition in the presence of peroxide catalysts has been disadvantageous in that the yields have been generally low, and undesirable by-products have been obtained which interfere with the isolation of the desirable reaction product. Metallic catalysts such as palladium or platinum have produced better results, particularly with patinum in the form of platinized charcoal. However, even with platinized charcoal the reactions have not been as rapid as desired, the yields have not been as high as desired and the presence of by-products has often presented difficulties.

While chloroplatinic acid is a generally useful catalyst for many reactions within the scope of Formula 1, chloroplatinic acid has certain disadvantages. For example, chloroplatinic acid is not always effective at very low concentrations, its high degree of insolubility in organic materials often renders it difficult to handle and its tendency to become poisoned by outside influences is greater than desired. Finally, chloroplatinic acid sometimes requires higher reaction temperatures than desired.

The object of the present invention is to provide an improved catalyst and process for the reaction of a silicon compound containing a silicon-hydrogen linkage with a compound containing aliphatic unsaturation to provide high yields of addition products without the formation of undesirable by-products, to provide the possibility of using less rigorous reaction conditions, to provide a catalyst material which is effective at low concentrations, to provide a catalyst with a high degree of organic solubility and to provide a catalyst which exhibits improved resistance to poisoning. Other objects of my invention will be obvious from the following description of my invention.

The objects of my invention are accomplished by conducting the reaction described in Formula 1 in the presence of a platinum-containing compound or complex prepared by (A) forming a reaction mixture of (1) chloroplatinic acid with (2) at least about 2 moles per gram atom of platinum of a member selected from the class consisting of (a) alcohols having the formula ROH, (b) ethers having the formula ROR, (c) aldehydes having the formula RCHO, and (d) mixtures of (a), (b) and (c), and (B) heating said reaction mixture at a temperature of from about 60 to 80° C. at a reduced pressure until the reaction mixture has a ratio of from about 2.0 to about 3.5 atoms of chlorine per atom of platinum, where R is a member selected from the class consisting of alkyl radicals containing at least 4 carbon atoms, alkyl radicals substituted with an aromatic hydrocarbon radical and alkyl radicals substituted with an OR′ group where R′ is a member selected from the class consisting of monovalent hydrocarbon radicals free of aliphatic unsaturation and monovalent radicals free of aliphatic unsaturation and consisting of carbon, hydrogen and oxygen atoms with each oxygen atom being attached to two atoms, at least one of which is a carbon atom and up to one of which is a hydrogen atom.

The precise chemical nature of the platinum-containing catalysts of the present invention is not known with certainty. However, it is known that the catalysts of the present invention are radically different from the chloroplatinic acid starting material. Whereas chloroplatinic acid contains 6 chlorine atoms per platinum atom, the catalysts of the present invention contain from 2.0 to 3.5 chlorine atoms per platinum atom. While chloroplatinic acid is soluble in water and polar organic materials such as the simple alcohols, the catalysts of the present invention is insoluble in water. It is, however, also soluble in the conventional simple alcohols. Chloroplatinic acid is insoluble in conventional hydrocarbon solvents such as benzene or toluene, while the catalyst of the present invention is readily soluble in these materials. Still further differences relate to the fact that based on catalyst content and a given addition reaction, the catalysts of the present invention bring the reaction to completion faster than chloroplatinic acid, also, the catalysts of the present invention exhibit an increased resistance to poisoning effects of extraneous materials over chloroplatinic acid.

Further insight into the nature of the catalyst of the present invention is gained from a detailed description of the method of preparing a specific catalyst within the scope of the present invention. Such catalyst is prepared by mixing 1 mole of chloroplatinic acid hexahydrate and 7 moles of octyl alcohol, until a solution was formed. The reaction mixture is then heated to a temperature of 70° C. and maintained at this temperature under a pressure of 25 millimeters. Hydrogen chloride and water which are formed during the reaction are immediately removed from the reaction mixture as formed. The reaction mixture is maintained under the pressure and temperature conditions recited for 40 hours. The course of the reaction is followed by withdrawing portions of the reaction mixture and examining the material withdrawn. During the course of the reaction, the chlorine to platinum ratio gradually falls from 6 atoms of chlorine per atom of platinum to 2 atoms of chlorine per atom of platinum. During this same period, infrared analysis indicates a reduction of the hydroxyl content of the reaction mixture. At the same time, an ether band and an aldehyde band are generated. At the end of 40 hours, infrared analysis indicates a constant level of hydroxyl groups, carbonyl groups and ether linkages. At the end of 40 hours, the reaction mixture is allowed to cool to room temperature at atmospheric pressure and the product is extracted with hexane, filtered, and hexane removed from the filtrate under vacuum. At this point, the catalyst appears to be a complex of $PtCl_2$ and an ether and aldehyde derived from octyl alcohol. The complex can also involve some other residue of the octyl alcohol, or the octyl alcohol can still be present as a solvent. In order to examine the product further, a portion of the reaction mixture is heated at 70° C. at 2 millimeters and maintained under these conditions to remove excess alcohol until infrared analysis no longer indicates the presence of hydroxyl groups. This material is then dissolved in hexane and filtered and hydrogen is bubbled through the filtrate to form a precipitate. Examination of the liquid filtrate shows only a trace of platinum. By an infrared comparison analysis against pure octyl aldehyde and octyl ether, the liquid is shown to contain 47.1% octyl ether and 12.8% octyl aldehyde. The remainder is identified as a hydrocarbon resin. From these data, it appears that the initial complex contained 1 mole of octyl aldehyde to 2 moles of octyl ether and 1 mole of platinum to 2 moles of chlorine. This evidence also indicates that the octyl alcohol in the composition was present only as a solvent.

A further indication of the fact that the catalyst just described is a complex of PtCl₂ and an aldehyde and an ether is indicated by the fact that when a mixture of 1 mole of chloroplatinic acid hexahydrate and 1 mole of octyl aldehyde and 2 moles of octyl ether are heated at a temperature of 70° C. at a pressure of 20 millimeters for 25 hours, the product formed is indistinguishable from the product prepared by heating the chloroplatinic acid with octyl alcohol.

While the exact chemical nature of the catalyst of the present invention is not known with certainty, its method of preparation is well defined. The chloroplatinic acid employed in preparing the composition is a commercially available material and in its most available form, is sold as the hexahydrate having the formula:

(2)   $H_2PtCl_6 \cdot 6H_2O$

However, this material can be obtained in anhydrous form and for purposes of the present invention can be used as either the hexahydrate or in the anhydrous form.

The previously mentioned alcohols having the formula ROH which are used in the preparation of the catalyst of the present invention are also well known in the art. These alcohols are characterized generally by the presence of an hydroxyl group attached to a hydrocarbon radical containing at least 4 carbon atoms. The preferred class of alcohols are those alcohols which can be termed alkanols having at least 4 carbon atoms. With alkanols having fewer than 4 carbon atoms, the product obtained by heating the alkanol, such as ethanol, with the chloroplatinic acid is a platinum olefin complex as distinguished from the catalysts of the present invention. Suitable alkanols for use in the practice of the present invention include alkanols containing from 4 to 16 or more carbon atoms. These alcohols include butanol, isobutanol, amyl alcohol, isoamyl alcohol, octyl alcohol, 2-ethylhexanol, tertiary butyl alcohol, undecanol, myricyl alcohol, etc. Another useful class of alcohols are the monoalkyl esters of alkylene glycols and polyalkylene glycols. Included within this class of alcohols can be mentioned, for example, the monomethyl ether of ethylene glycol, the monobutyl ether of ethylene glycol, the monomethyl ether of diethylene glycol, the monobutyl ether of diethylene glycol and the monomethyl ethers of higher polyalkylene glycol such as the monomethyl ethers of higher ethylene glycols and propylene glycols as well as the monomethyl and monobutyl ethers of mixed polyethylene-polypropylene glycols. Many of these latter materials are commercially available and sold, for example, under the names of "Carbowax" and "Ucon" by the Union Carbide Corporation. Also included within the alkanols useful in the manufacture of the catalysts of the present invention are cyclic alcohols such as cyclohexyl alcohol, etc. The preferred alcohol for use in the practice of the present invention is octyl alcohol.

The aldehydes of the formula RCHO, which are useful in the practice of the present invention, are also well known materials and for the most part correspond to the alcohols previously described. Thus, included within the scope of the aldehydes are all of those aldehydes equivalent to the alcohols previously described where the hydroxyl group has been replaced with a —CHO radical. Typical of the aldehydes are the aldehydes containing at least 5 carbon atoms, e.g., from 5 to 15 carbon atoms. Included within this group of alkanals is amyl aldehyde, octyl aldehyde, 2-ethylhexyl aldehyde, undecanal, myristyl aldehyde, etc.

The ethers which are useful in preparing the catalysts of the present invention and which have the formula ROR, are also well known in the art and correspond to those ethers which would be formed by splitting a molecule of water from 2 molecules of one of the previously described alcohols having the formula ROH. Typical of these ethers can be mentioned, those ethers in which both of the organic groups attached to the ethereal oxygen atom contain at least 4 carbon atoms, e.g., from 4 to 14 carbon atoms. Preferred are those ethers in which both of the R groups are alkyl radicals. Specific ethers useful in the practice of the present invention include, for example, dibutyl ether, ditertiary butylether, diamyl ether, dioctyl ether, di-2-ethylhexyl ether, dimyristyl ether, etc.

The preferred aldehyde for use in the practice of the present invention is octyl aldehyde and the preferred ether is dioctyl ether.

As previously mentioned, the catalyst of the present invention is prepared by reacting chloroplatinic acid with an alcohol of the formula ROH, an aldehyde of the formula RCHO or an ether of the formula ROR, or any mixture thereof so long as there is present at least about 2 moles of the alcohol, ether or aldehyde per mole of platinum atoms. The minimum of 2 moles per mole of platinum atoms is related to solubility of the chloroplatinic acid in the other reactant rather than any critical problem of stoichiometry. In most cases, at least 2 moles of the alcohol, aldehyde or ether are required to dissolve the chloroplatinic acid and to insure therefore, a uniform reaction mixture. While there is no known upper limit to the amount of alcohol, ether or aldehyde employed, any excess alcohol ether or aldehyde merely serves as a solvent for the reaction mixture. While the presence of some solvent is desired, the presence of a large excess of solvent is to be avoided since it will usually be desired to employ in the addition reaction of Equation 1 a catalyst having as high a concentration of platinum as possible.

In view of these considerations, satisfactory reaction mixtures contain from about 2 to about 20 moles of the alcohol, ether or aldehyde per mole of platinum atoms. Although higher amounts of the organic reactant can be employed if desired, preferably from 2 to 7 moles of the alcohol, ether or aldehyde are employed per mole of platinum atoms.

Whether the reaction mixture includes only an alcohol, only an ether or only an aldehyde or any mixture of any two of these organic components or all three of these organic components, the nature of the resulting reaction product is the same in terms of its differences from chloroplatinic acid and its utility in effecting addition reactions of Equation 1.

After forming the reaction mixture of the chloroplatinic acid and the alcohol, ether or aldehyde, the catalyst of the present invention is prepared by heating the reaction mixture at reduced pressures. As previously mentioned, the heating under reduced pressures reduces the ratio of chlorine to platinum in the reaction mixture from a starting ratio of 6:1 to a final ratio which varies from about 2:1 up to 3.5:1. For efficiency of reaction, the reaction temperature should be maintained in the range of from about 60 to 80° C. At temperatures significantly above 80° C., it is found that the reaction mixture begins to decompose and elemental platinum is precipitated, resulting in an economic waste. On the other hand, at temperatures significantly below about 60° C., the rate of reaction between the chloroplatinic acid and the alcohol, ether or aldehyde is so slow that unduly long times are required to prepare the catalyst of the present invention. Regardless of whether the reaction mixture contains an alcohol, an ether or an aldehyde, two of the products of the reaction are hydrogen chloride and water. Unless both the hydrogen chloride and water are removed from the reaction mixture as they are formed, the reaction to form the catalyst of the present invention proceeds at a negligible rate. Accordingly, for satisfactory results, the reaction mixture is heated at reduced pressures. While the particular pressure is not critical, it is preferred to maintain the reaction mixture at a pressure sufficiently low so that the water and hydrogen chloride are removed as formed, while no significant amount of unreacted alcohol, ether or aldehyde are removed. Satisfactory reduced pressures for accomplishing this result are to some extent a function of the temperature of the reaction mixture but generally are below about 100 millimeters, and preferably are in the range of from about 10 to 50 millimeters.

The time required for the preparation of the catalyst of the present invention varies with the reaction temperature, the particular reactants employed and the proportions of the various reactants. The reaction time also is a function of the chlorine to platinum ratio desired in the final product. Generally, however, the initial platinum to chlorine ratio is reduced to the desirable range of from 2:1 up to 3.5:1 in times which vary from about 2 hours to 24 hours, regardless of variations in the reactants and reaction conditions. In the preferred embodiment of my invention, the reaction between the chloroplatinic acid and the alcohol, ether or aldehyde is continued for a time sufficient to reduce the ratio of chlorine to platinum to the range of about 2:1 up to about 2.5:1.

It is apparent that some of the alcohols, aldehydes or ethers which are reacted with chloroplatinic acid to form the catalyst of the present invention are solid materials which do not have melting points below the 60 to 80° C. temperature at which reaction is effected. Where such a material is employed as a reactant, it is desirable to add an inert solvent to the reaction mixture to facilitate the reaction. Suitable solvents include the various hydrocarbon solvents such as benzene, toluene, xylene, mineral spirits, etc. In general, it is desirable to select a solvent which will evaporate from the reaction mixture under the reaction conditions.

The platinum-containing catalysts of the present invention are operative for the addition of an unlimited class of silicon compounds containing a silicon-hydrogen linkage to an unlimited group of organic compounds containing a pair of aliphatic carbon atoms linked by multiple bonds, as illustrated, for example, in Formula 1.

As an illustration of the addition reactions in which the platinum-containing catalysts of the present invention are operative, reference is made to Patent 2,823,218—Speier et al. The catalyst of the present invention is operative for every one of the addition reactions described in the aforementioned reaction. As a further illustration of reactions in which the catalyst of the present invention is applicable, reference is made to Patent 2,970,150—Bailey. The catalysts of the present invention are also applicable to every one of the reactions illustrated in this Bailey patent.

The organosilicon reactant containing the silicon-hydrogen linkage can be inorganic or organic and can be monomeric or polymeric. The only requirement of the silicon-hydrogen-containing reactants is that the reactant contain at least one silicon-bonded hydrogen atom per molecule, with no more than two hydrogen atoms attached to any one silicon atom.

Among the inorganic monomeric materials which contain silicon-bonded hydrogen atoms and which are useful as reactants in the process of the present invention can be mentioned, for example, trichlorosilane and dibromosilane. Among the operable polymeric inorganic materials can be mentioned pentachlorodisilane, pentachlorodisiloxane, heptachlorotrisilane, etc.

Among the monomeric silicon compounds and organosilicon compounds containing silicon-hydrogen linkages which are operable in the practice of the present invention are those having the formula:

(3) $\quad (Z)_a Si(H)_b (X)_{4-a-b}$ where X is a member selected from the class consisting of halogen, —OZ radicals, and —OOCZ radicals, Z can be any organic radical, but preferably is a member selected from the class consisting of monovalent hydrocarbon radicals, halogenated monovalent hydrogen radicals and cyanoalkyl radicals, $a$ has a value of from 0 to 3, inclusive, $b$ has a value of from 1 to 2, inclusive, and the sum of $a$ plus $b$ is from 1 to 4, inclusive. Where more than one Z radical is present in a compound within the scope of Formula 3, the various Z radicals can differ from each other. Among the radicals represented by Z can be mentioned, for example, alkyl radicals, e.g., methyl, ethyl, propyl, octyl, octadecyl, etc. radicals; cycloalkyl radicals such as, for example, cyclohexyl, cycloheptyl, etc. radicals; aryl radicals, e.g., phenyl, naphthyl, tolyl, xylyl, etc. radicals; aralkyl radicals, e.g., benzyl, phenyl ethyl, etc. radicals; and haloaryl and haloalkyl radicals, e.g., chloromethyl, chlorophenyl, dibromophenyl, etc. radicals. In the preferred embodiment of my invention, the Z radical is methyl or a mixture of methyl and phenyl. In addition to the radicals mentioned above, the Z radical can also be an unsaturated aliphatic radical such as vinyl, allyl, cyclohexenyl, etc. When the Z radical is a radical with aliphatic unsaturation it is possible to react the silicon compound containing silicon-hydrogen linkages with itself.

Among the specific type of monomeric silicon compounds and organic silicon compounds within the scope of Formula 3 are those having the formula:

$ZSiHCl_2$, $Z_2SiHCl$, $Z_3SiH$, $ZSiH_2Cl$, $Z_2SiH_2$,
$HSi(OZ)_3$, $H_2Si(OZ)_2$, $ZSiH(OZ)_2$, $HSi(OOCZ)_3$,
$ZSiH(OOCZ)_2$ and $SiHCl_3$ where Z is as previously defined.

Among the silicon-hydrogen containing compounds useful in the practice of the present invention are those in which each molecule contains more than one silicon atom. Within this category are included organopolysilanes, organopolysiloxanes and various polysilalkalene compounds containing, for example, a —$SiCH_2Si$— grouping or a —$SiCH_2CH_2Si$— grouping and polysilphenylene materials which contain the —$SiC_6H_4Si$— grouping and the organosilazanes which are characterized by an Si—N—Si linkage in the polymer structure. Among the structurally uncomplicated silicon-hydrogen compounds containing more than one silicon atom are materials having the formulae:

$Z_2HSiSiZ_3$, $Z_2HSiSiH_2Z$, $Z_3SiOSiHZ_2$,
$ClZ_2SiOSiHCl_2$, $Z_3SiCH_2CH_2SiHZ_2$,
$HZ_2SiC_6H_4SiZ_2H$, $Z_3SiO(ZHSiO)_cSiZ_3$ where Z is as previously defined and $c$ is an integer, for example, an integer equal to from 1 to 10,000 or more.

Among the organopolysiloxanes operable in the practice of the present invention are polymers and copolymers containing up to one or more of the units having the formula:

$Z_3SiO_{0.5}$, $Z_2SiO$, $ZSiO_{1.5}$ or $SiO_2$ along with at least one unit per molecule having the formula:

$ZHSiO$, $Z_2HSiO_{0.5}$, $HSiO_{1.5}$, $H_2SiO$ or $ZH_2SiO_{0.5}$ where Z is as previously defined.

While any of the silicon-hydrogen compounds described above are operative in the practice of the present invention, it is preferred that the silicon-hydrogen compound be an organopolysiloxane such as an organocyclopolysiloxane having the formula:

(4) $\quad (ZHSiO)_d$ or an organopolysiloxane polymer or copolymer having the formula:

(5)     $(Z)_e Si(H)_f O_{\frac{4-e-f}{2}}$ where Z is as previously defined, d is as previously defined, e has a value of from 0.5 to 2.49, f has a value of from 0.001 to 1.0 and the sum of e plus f is equal to from 1.0 to 2.5. Organopolysiloxanes within the scope of the Formulae 4 and 5 are well known in the art and are prepared, for example, by the hydrolysis and condensation of various organochlorosilanes. Thus, where Z is methyl, cyclopolysiloxanes within the scope of Formula 4 can be prepared by hydrolyzing and condensing methyldichlorosilane. Products within the scope of Formula 5 can be prepared by cohydrolyzing and cocondensing a mixture of two or more chlorosilanes, at least one of which contains a silicon-bonded hydrogen atom. For example, compounds within the scope of Formula 5 can be prepared by the cohydrolysis and cocondensation of one or more members selected from the class consisting of trimethylchlorosilane, dimethylchlorosilane, methyltrichlorosilane or silicon tetrachloride with one or more members selected from the class consisting of methyldichlorosilane, dimethylchlorosilane, trichlorosilane, dichlorosilane, or methylchlorosilane.

The unsaturated compounds containing olefinic or acetylenic unsaturation which can react with the compounds described above containing the silicon-hydrogen linkage includes substantially all of the aliphatically unsaturated compounds known to the art. Thus, the aliphatically unsaturated compound may be a monomeric or polymeric material. The unsaturated compound can contain carbon and hydrogen only, or may also contain any other element. Where the aliphatically unsaturated compound contains an element other than carbon and hydrogen, it is preferred that the other element be oxygen, a halogen, nitrogen or silicon or mixtures of these other elements. The aliphatically unsaturated compound can contain a single pair of carbon atoms linked by multiple bonds or can contain a plurality of pairs of carbon atoms linked by multiple bonds. Among the many unsaturated hydrocarbons applicable to the present invention can be mentioned for purposes of illustration, ethylene, propylene, butylene, octylene, styrene, butadiene, pentadiene, pentene-2, divinylbenzene, vinylacetylene, etc. Preferably, the hydrocarbon is one having no more than 20 to 30 carbon atoms in the chain.

Included among the oxygen-containing unsaturated compounds which can be employed in the practice of the present invention are methylvinyl ether, divinyl ether, phenylvinyl ether, the monoallyl ether of ethylene glycol, allyl aldehyde, methylvinyl ketone, phenylvinyl ketone, acrylic acid, methacrylic acid, methylacrylate, phenylmethacrylate, vinylacetic acid, vinyloctoate, vinylacetate, oleaic acid, linoleaic acid, etc. Unsaturated compounds applicable in the process of the present invention also include acylic and heterocyclic materials containing aliphatic unsaturation in the ring. Included within this class of compounds are, for example, cyclohexene, cycloheptene, cyclopentadiene, dihydrofuran, dihydropyrene, etc.

The sulfur analogs of any of the unsaturated oxygen-containing materials can also be employed in the practice of the present invention. In addition to compounds containing carbon, hydrogen and oxygen, compounds containing other elements can also be employed. Thus, halogenated derivatives of any of the materials described above can be employed including the acyl chlorides as well as compounds containing a halogen substituent on a carbon atom other than a carbonyl carbon atom. Thus, applicable halogen-containing materials include, for example, vinylchloride, the vinylchlorophenyl ethers, the allyl ester of trichloroacetic acid, etc.

Other types of unsaturated materials useful in the practice of the present invention include unsaturated materials containing nitrogen substituents such as acrylonitrile, allyl cyanide, nitroethylene, etc.

The unsaturated compounds useful in the practice of the present invention also include polymeric materials containing aliphatic unsaturation such as the polyester resins prepared from polybasic saturated or unsaturated acids with polyhydric unsaturated alcohols, and the polyester resins prepared by reacting unsaturated polybasic acids with saturated polyhydric alcohols. Thus, a suitable polyester is one prepared by condensing maleic acid with ethylene glycol.

One of the particularly useful types of unsaturated compound which can be employed in the practice of the present invention are those compounds containing silicon, such as the materials commonly referred to as organosilicon monomers or polymers. The scope of the organosilicon compounds which are applicable to the process of the present invention is identical to the scope of the silicon-hydrogen compounds useful in the practice of the present invention. The unsaturated organosilicon compounds are identical to the silicon-hydrogen compounds except that the silicon-bonded hydrogen atom is substituted with a silicon-bonded organic radical containing at least one pair of aliphatic carbon atoms linked with multiple bonds. Preferably, these organosilicon compounds are free of silicon-bonded hydrogen atoms, but it is also possible to employ organosilicon compounds containing both silicon-bonded hydrogens and silicon-bonded radicals containing silicon-bonded aliphatically unsaturated radicals. The only requirement of these unsaturated organosilicon compounds is that there be at least one aliphatically unsaturated organic radical attached to silicon per molecule. Thus, the aliphatically unsaturated organosilicon compounds include silanes, polysilanes, siloxanes, silazanes, as well as monomeric or polymeric materials containing silicon atoms joined together by methylene or polymethylene groups or by phenylene groups.

Of the broad class of aliphatically unsaturated organosilicon compounds which can be employed in the practice of the present invention, there are three groups of such compounds which are preferred. One of these groups is the monomeric silanes having the formula:

(6)     $(Y)_m (Y')_n Si(X)_{4-m-n}$ where X is as previously defined, Y is a monovalent hydrocarbon radical of the scope previously defined for Z, Y' is an organic radical containing at least one pair of aliphatic carbon atoms attached by multiple bonds, m is equal to from 0 to 3, inclusive, n is equal to from 1 to 4, inclusive, and the sum of m plus n is equal to from 1 to 4, inclusive.

A second class of preferred unsaturated organosilicon compounds are those cyclopolysiloxanes having the formula:

(7)     $(YY'SiO)_d$ where Y and Y' and d are as previously defined. The third group of unsaturated organic silicon compounds preferred in the practice of the present invention are those having the formula:

(8)     $(Y)_e (Y')_f SiO_{\frac{4-e-f}{2}}$ where Y, Y', e and f are as previously defined.

All of the organic silicon compounds within the scope of Formulae 6, 7 and 8 are well known in the art and are prepared by conventional methods. Included among the organic silicon compounds within the scope of Formulae 6, 7 and 8 are the preferred types of material in which Y is methyl or a mixture of methyl and phenyl and in which Y' is an alkenyl radical, preferably vinyl or allyl.

Within the scope of Formula 6 are silanes such as methylvinyldichlorosilane, vinyltrichlorosilane, allyltrichlorosilane, methylphenylvinylchlorosilane, phenylvinyldichlorosilane, diallyldichlorosilane, vinyl - beta - cyanoethyldichlorosilane, etc. Included among the cyclic products within the scope of Formula 7 are, for example, the cyclic trimer of methylvinylsiloxane, the cyclic pentamer of methylvinylsiloxane, the cyclic tetramer of methylvinylsiloxane, the cyclic tetramer of vinylphenylsiloxane, etc.

Included within the scope of Formula 8 are the broad class of well known organopolysiloxanes which can be resinous materials, low viscosity fluids, or high molecular weight gummy materials. These polymeric materials are prepared by the well known method of hydrolysis and condensation of a particular diorganodichlorosilane or by the cohydrolysis and co-condensation of a mixture of several different diorganodichlorosilanes. Thus products within the scope of Formula 8 can be prepared by the hydrolysis and condensation of vinyltrichlorosilane alone, divinyldichlorosilane alone, methylvinyldichlorosilane alone, phenylvinyldichlorosilane alone, or by the cohydrolysis and co-condensation of any of the aforementioned vinyl-containing chlorosilanes with one or more monoorganotrichlorosilanes, diorganodichlorosilanes, triorganochlorosilanes, or silicon tetrachloride. While the hydrolysis and cohydrolysis above have been described in connection with vinyl-containing organo silicon compounds it should be understood that in place of the vinyl group can be any silicon-bonded organic radical containing at least one pair of aliphatic carbon atoms linked by multiple bonds.

To effect reaction between the silicon-hydrogen containing reactant and the reactant containing aliphatic unsaturation, the two reactants are merely mixed in the desired proportions and the desired amount of catalyst is added, and the reaction mixture is maintained at the desired reaction temperature for a time sufficient to effect the addition of the silicon-hydrogen bond across the multiple bonds of the aliphatically unsaturated compound. The relative amounts of the silicon-hydrogen containing compound and the compound containing multiple bonds can vary within extremely wide limits. In theory, one silicon-hydrogen bond is equivalent to one olefinic double bond or one-half acetylenic triple bond so that this equivalency establishes the general order of magnitude of the two reactants employed. However, for many purposes it can be desirable to employ an excess of one of the reactants to facilitate the completion of the reaction or to insure that the reaction product still contains either silicon-hydrogen bonds in the unreacted state, or still contains one or more pairs of carbon atoms linked by multiple bonds. In general, however, the ratios of the reactants are selected so that there are present from about 0.005 to 20 silicon-hydrogen linkages available in one reactant per pair of aliphatic carbon atoms linked by double bonds in the other reactant or from about 0.06 to 15 silicon-hydrogen linkages in one reactant per pair of aliphatic carbon atoms linked by triple bonds in the other reactant.

The amount of catalyst of the present invention employed in effecting the addition reaction can vary within extremely wide limits. One of the advantages of the catalyst of the present invention is its high activity in low concentration, such as concentrations of the order of 1 mole of catalyst (providing one mole of platinum) per billion moles of unsaturated groups in the organic compound containing at least one pair of aliphatic carbon atoms linked by multiple bonds. While the platinum-containing catalyst of the present invention is operative in such minute amounts the desired addition reaction is generally effected more rapidly with higher concentrations of catalyst. Thus, concentrations as high as 1 to 10 moles of catalyst per thousand moles of unsaturated groups in the unsaturated compound can be employed. Generally the economics of the reaction dictates the particular level of catalyst employed. The advantages of using low catalyst concentrations includes low catalyst cost and the absence of any substantial amount of catalyst as a contaminant in the final product. The advantage of increased catalyst is increased rate of reaction. In general, it has been found that satisfactory rates of reaction are obtained when the catalyst is used in an amount sufficient to provide one mole of platinum per 1,000 moles unsaturated groups to one mole of catalyst per 1,000,000 moles of aliphatically unsaturated groups in the unsaturated organic compound.

Because the catalyst is employed in such minute quantities it is often desirable to use the catalyst as a solution in a diluent to facilitate uniform dispersion of the catalyst in the reactants. Suitable diluents are any material which is a solvent for the catalyst and which is inert to the reactants under the conditions of the reaction. The preferred diluents are hydrocarbon solvents such as aromatic hydrocarbons, including benzene, toluene and xylene. However, aliphatic solvents such as aliphatic mineral spirits can also be employed. In addition to these carbon solvents the diluent can be an alcohol or ether. Where a diluent is employed the diluent is employed in an amount equal to from 10 to 10,000 parts by weight diluent per part of the catalyst compound of the present invention.

To effect the addition reactions with the catalyst of the present invention, the two reactants and the diluted platinum catalyst are thoroughly mixed and maintained at the reaction temperature for a time sufficient to effect the reaction. Because of the high activity of the catalyst of the present invention, some degree of reaction often occurs at room temperature as soon as the catalyst is mixed with the reactants. Accordingly, the reaction temperature can be room temperature or even a temperature as low as about 0° C. On the other hand there is no upper limit to the temperature at which the reaction can be run except temperature limitations imposed by the particular reactants and the particular diluent used for the platinum-containing catalyst. Thus, reaction temperatures on the order of 150 to 200° C. can be employed. Preferably, however, the reaction is effected at temperatures in the range of from about 60 to 130° C. The time required for effecting the addition reaction depends upon a number of factors such as the particular reactants employed and the amount of catalyst employed. Thus, reaction times can run from a few minutes up to 12 or more hours depending on reaction conditions.

In some cases, in addition to employing a diluent for the catalyst it is desirable to employ also a solvent for one or both of the reactants. Again the amount of solvent employed in this case is not critical and can vary without limit except for economic considerations. Any solvent can be employed which will dissolve the desired reactant or reactants and which also is inert to the reactants under the conditions of the reaction.

The following examples are illustrative of the practice of my invention and are not intended for purposes of limitation. All parts are by weight.

*Example 1*

A catalyst within the scope of the present invention was prepared by dissolving one part by weight of chloroplatinic acid hexahydrate in ten parts of octyl alcohol and heating the solution at 70 to 75° C. at 25 millimeters for 16 hours during which time all water and hydrogen chloride was removed. The pressure was then reduced to 5 millimeters to remove all unreacted octyl alcohol. At the end of this time a product was obtained which was a dark, reddish-brown liquid soluble in alcohols, acetone, benzene, hexane, xylene, toluene and other common solvents. Chemical analysis of this mixture showed it to contain 3.5 atoms of chlorine per atom of platinum and 0.035 gram platinum per gram of the mixture.

*Example 2*

A methylvinylpolysiloxane fluid chain-stopped with trimethylsilyl units was prepared by conventional procedures from hexamethyldisiloxane, octylmethyl cyclotetrasiloxane and cyclic tetramer of methylvinylsiloxane. This fluid contained 0.3 mole percent methylvinylsiloxane units and had a viscosity of 500 centistokes at 25° C. A methyl hydrogen polysiloxane fluid was prepared by the cohydrolysis of methyldichlorosilane and dimethyldichlorosilane in amounts sufficient to provide 2.5 mole percent methylhydrogen siloxane units in the fluid which had a viscosity of about 150 centistokes at 25° C. A mixture was prepared of 50 parts of the methylvinylpolysiloxane fluid and 6 parts of the methyl hydrogen polysiloxane fluid. The catalyst mixture of Example 1 was diluted with sufficient toluene to provide 0.00195 gram platinum per gram of toluene solution and a sufficient amount was added to the mixture of the two siloxane fluids to provide one mole platinum per 2,000 moles of vinyl groups. This mixture was heated at 120° C. until a soft, rubber-like polymer was obtained. One-half hour was required for this cure to take place, during which time the silicon-hydrogen bonds of the methyl hydrogen polysiloxane fluid added across the silicon-bonded vinyl groups of the methylvinyl polysiloxane fluid. When the procedure of this example was repeated except that the same amount of platinum as a solution of chloroplatinic acid hexahydrate in sufficient amount of isoamyl alcohol to provide 0.00195 gram platinum per gram alcohol solution was employed as the catalyst, two hours were required for a comparable cure.

*Example 3*

The procedure of Example 2 was repeated except that both the catalyst of Example 1 and the chloroplatinic acid hexahydrate in isoamyl alcohol were reduced to ten percent of the amount used in Example 1. In this case the diluted catalyst of Example 1 cured the fluid mixture to a soft, rubber-like consistency in 12 hours at 120° C. No change in the fluids were observed after 72 hours employing the diluted chloroplatinic acid.

*Example 4*

When attempts were made to cure the two catalyzed polysiloxane solutions of Example 2, when either a polyethylene tape or a polyethylene terephthalate tape was immersed in the siloxane, it was found that the solution catalyzed with the toluene solution of the catalyst of the present invention cured to a soft rubber-like gum in from ½ hour to 1 hour at 120° C. On the other than when the isoamyl alcohol solution of chloroplatinic acid was employed no cure was obtained after 24 hours.

*Example 5*

A methylphenylvinylpolysiloxane fluid was prepared which contained trimethylsilyl units, dimethylsiloxane units, methylphenylsiloxane units, and methylvinylsiloxane units. This fluid had a viscosity of 1500 centistokes at 25° C. and contained 0.5 mole percent methylvinylsiloxane units, and 27.8 mole percent methylphenylsiloxane units. A methylphenyl hydrogen polysiloxane fluid was prepared by cohydrolyzing methyldichlorosilane, methylphenyldichlorosilane and dimethyldichlorosilane to yield a fluid having a viscosity of about 300 centistokes when measured at 25° C. and containing 5 mole percent methylhydrogensiloxane units and 24 mole percent methylphenylsiloxane units. A mixture was prepared of 50 parts of the methylphenylvinylpolysiloxane fluid, 6 parts of the methylphenyl hydrogen polysiloxane fluid and a sufficient amount of a toluene solution of the catalyst of Example 1 which contained 0.00195 gram of platinum per gram of solution to provide one mole of platinum per 2800 moles of vinyl groups. The mixture was heated at 120° C. to form a soft rubber-like polymer which resulted from the addition of the silicon-hydrogen bonds of the methylphenyl hydrogen polysiloxane fluid across the vinyl groups of the methylphenylvinyl polysiloxane fluid. This rubbery material had excellent physical properties and thermal stability at 240° C.

*Example 6*

A mixture was prepared of 100 parts vinyl acetate, 65 parts methyldichlorosilane and sufficient amount of the catalyst of Example 1 as a toluene solution containing 0.0195 gram platinum per gram solution to provide $2 \times 10^{-5}$ mole platinum per mole of vinyl acetate. This mixture was refluxed for 24 hours resulting a 75% yield of a methyl acetoxy ethyldichlorosilane having the formula:

$$(CH_3)(CH_3COOCH_2CH_2)SiCl_2$$

This material was a clear liquid having a boiling point of 96° C. at 20 mm.

*Example 7*

A mixture was prepared of 6 parts cyclohexene, 9 parts methyldichlorosilane, and sufficient amount of catalyst solution of Example 6 to provide $2 \times 10^{-5}$ mole platinum per mole of cyclohexene. Heating this mixture in a sealed tube for 16 hours at 100° C. resulted in a 50% yield of methylcyclohexyldichlorosilane having a boiling pont of 120° C. at 20 mm.

*Example 8*

A mixture was prepared of 10 parts of heptafluoropentene-1, 5 parts methyldichlorosilane and sufficient amount of the catalyst solution of Example 6 to provide $2 \times 10^{-5}$ mole platinum per mole of heptafluoropentene-1. Heating this mixture in a sealed tube at 100° C. for 16 hours resulted in a 90 percent yield of methylheptafluoropentyldichlorosilane having a boiling point of 85° C. When the procedure of this example was repeated except that an isoamyl alcohol solution of chloroplatinic acid in an amount sufficient to provide $2 \times 10^{-5}$ moles platinum per mole of heptafluoropentene-1 was employed as a catalyst, no reaction occurred after sealed tube heating for 16 hours at 100° C.

*Example 9*

A mixture was prepared of 100 parts methylmethacrylate, 114 parts methyldichlorosilane and sufficient amount of the catalyst of Example 6 to provide $2 \times 10^{-5}$ mole platinum per mole of methylmethacrylate. Heating of of this mixture for 8 hours at reflux resulted in a 90 percent yield of the addition product having the formula:

$$CH_3OOCCHCH_3CH_2Si(CH_3)(Cl)_2$$

and having a melting point of 93° C. at 20 mm.

*Example 10*

A mixture was prepared of 7 parts by weight methylmethacrylate, 25 parts phenyldichlorosilane and sufficient amount of the catalyst of Example 6 to provide $2 \times 10^{-5}$ mole platinum per pole of methylmethacrylate. Heating of this mixture at reflux temperature for 1 hour resulted in a 73.5 percent yield of the addition product having the formula:

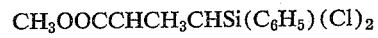

$$CH_3OOCCHCH_3CHSi(C_6H_5)(Cl)_2$$

and having a boiling point of 117° C. at 2 mm.

*Example 11*

One part of chloroplatinic acid hexahydrate was mixed with 30 parts of myristyl alcohol and the mixture was heated at 85 to 90° C. at 25 millimeters. At the end of 24 hours removal of water and hydrogen chloride was completed to produce a myristyl alcohol solution of a catalyst within the scope of the present invention having a ratio of 3.0 chlorine atoms per platinum atom. This catalyst solution contained .013 gram of platinum per gram of solution.

*Example 12*

A mixture was prepared of 50 parts of the methylvinylpolysiloxane fluid of Example 2, 6 parts of the methyl hydrogen polysiloxane fluid of Example 2, and sufficient amount of the catalyst of Example 11 to provide $1 \times 10^{-6}$ moles of platinum per mole of vinyl groups in the methylvinylpolysiloxane fluid. This mixture was heated at 120° C. for 1 hour to provide a soft, rubbery, polymeric material similar to the material prepared in Example 2.

Example 13

A mixture was prepared of 1 part anhydrous chloroplatinic acid and 30 parts of a monomethyl ether of a polyethylene glycol having a molecular weight of approximately 560. This mixture was heated at a temperature of about 90° C. at a pressure of 15 millimeters for 18 hours, at the end of which time hydrogen chloride was no longer liberated by the system. This resulted in a catalyst solution within the scope of the present invention which contained about 2.5 atoms chlorine per atom of platinum and which contained 0.13 gram of platinum per gram of solution.

Example 14

The procedure of Example 12 was repeated except that the catalyst employed was the catalyst solution of Example 13 which was present in an amount to provide $1 \times 10^{-5}$ moles platinum per mole of vinyl groups in the methylvinylpolysiloxane. After heating this mixture at 125° C. for 1 hour, a product substantially identical to that of Example 12 was formed.

Example 15

One part by weight of chloroplatinic acid hexahydrate was mixed with 8 parts by weight of pentanol-1 and the mixture was heated at 75–80° C. at a pressure of 25 millimeters for 12 hours, during which time water and hydrogen chloride were removed from the system. The pressure was then reduced to 5 millimeters and the heating was continued for an additional 3 hours to remove unreacted pentanol resulting in a liquid catalyst which contained 2.5 chlorine atoms per platinum atom and which after hydrogenation and filtration left a liquid containing amyl aldehyde and amyl ether. This liquid contained no evidence of pentanol-1.

Example 16

Following the procedure of Example 12, a mixture was prepared of 50 grams of the methylvinylpolysiloxane fluid of Example 2, 6 grams of methyl hydrogen polysiloxane fluid of Example 2, and a sufficient amount of the catalyst of Example 15 to provide $2.5 \times 10^{-6}$ moles platinum per mole of vinyl groups in the methylvinylpolysiloxane fluid. Heating of this mixture at 100° C. for ½ hours resulted in a rubbery copolymer similar to that of Example 12.

Example 17

When the procedure of Example 15 was repeated except that isoamyl alcohol (2-methylbutanol-4) was substituted for the pentanol-1 of Example 15, a catalyst composition substantially identical to that of Example 15 was formed except that the isoamyl groups replaced the normal pentyl radicals. When the procedure of Example 16 was repeated except that the catalyst of this example was employed, a rubbery polymeric material was also formed in about ½ hour.

Example 18

This example illustrates the use of the catalyst of the present invention in effecting reaction between a methylvinylpolysiloxane and a methylhydrogenpolysiloxane in which the mole percent of vinyl groups and the mole percent of hydrogen groups is varied. The methylvinylpolysiloxanes were prepared from dimethylsiloxane units, methylvinylsiloxane units, and trimethylsiloxane units and contained 5, 10, 25, 37½, 50 and 100 mole percent methylvinylsiloxane units. The methyl hydrogen polysiloxane fluids were prepared from trimethylsiloxane units and methylhydrogen polysiloxane units. The methyl hydrogen polysiloxane fluids contained the same level of methyl hydrogen polysiloxane units as the methylvinylpolysiloxane contained methylvinylsiloxane units. All of the fluids had a viscosity of about 500 centistokes when measured at 25° C. A series of mixtures was prepared, each of which contained the same number of methylvinylsiloxane units and methyl hydrogen siloxane units. For example, one pair of fluids was prepared from the 50 mole percent methylvinylpolysiloxane fluid and the 50 mole percent methylhydrogenpolysiloxane fluid. To each fluid mixture was added a sufficient amount of the catalyst solution of Example 1 to provide 1 mole platinum per one thousand moles of vinyl groups in the mixture. Each mixture was then heated at 120° C. until cure was effected. In general, complete cure was obtained in times of from about ½ hour to 2 hours. The cured product obtained from the 5 mole percent methylvinylpolysiloxane and the 5 mole percent methyl hydrogen polysiloxane was a soft, resilient rubber-like material. The material prepared from the 100 percent methylvinylpolysiloxane and the 100 percent methylhydrogenpolysiloxane was a hard, glasslike resin. Materials prepared from the intermediate fluids had physical properties intermediate to the hard, glasslike resin and soft, resilient rubber-like polymer.

Example 19

A mixture was prepared of 70 parts of a methylphenylvinylpolysiloxane gum having a viscosity in excess of 10 million centistokes at 25° C. and consisting of 6 mole percent diphenylsiloxane units, 0.2 percent methylvinylsiloxane units, with the remainder being dimethylsiloxane units, 30 parts by weight of fumed silica, 0.18 part by weight of the cyclic tetramer of methylhydrogensiloxane and sufficient amount of the catalyst of Example 1 to provide one atom of platinum per ten thousand vinyl groups in the mixture. This mixture was milled on a conventional rubber mill and one portion was allowed to remain at room temperature while another portion was press-cured for 15 minutes at 140° C. and subsequently oven-cured for 24 hours at 200° C. and heated 24 additional hours at 250° C. At the end of this time the heat-cured material had a shore A hardness of 63, a tensile strength of 1025 p.s.i., 250% elongation and 85 lbs. tear strength, indicating that a completely cured silicone rubber had been obtained. The material which was allowed to stand at room temperature began to harden after 3 to 4 hours, and at the end of 24 hours was also a rubbery material, indicating that cure of the compound also takes place at room temperature.

Example 20

A catalyst within the scope of the present invention was prepared by dissolving chloroplatinic acid in 2-ethylhexyl alcohol in the ratio of 1 mole of chloroplatinic acid hexahydrate and 7 moles of octyl alcohol. The pressure on the resulting reaction mixture was reduced to 25 millimeters and the reaction mixture was heated for 40 hours at 70° C., during which time hydrogen chloride and water were removed from the system. The pressure was then further reduced to 2 millimeters and the heating was continued until all unreacted alcohol had been removed. The reaction mixture was then allowed to cool at room temperature and was filtered. The filtrate was a viscous, pale brown liquid and comprised the catalyst of the present invention. This catalyst contained 21 percent by weight platinum and 8.3 percent by weight chlorine, which corresponds to about 2.1 atoms of chlorine per atom of platinum. In order to further characterize the catalyst, the catalyst was dissolved in an equal volume of hexane and hydrogen was bubbled through the hexane solution for 2 hours. After filtration and evaporation of the hexane solvent, the resulting liquid showed only a trace of platinum. Analysis of this resulting liquid showed it to contain 47.1 percent by weight octyl ether, 12.8 percent by weight octyl aldehyde and 42.1 percent of a hydrocarbon resin. This corresponds to a ratio of 1 mole of octyl aldehyde to 2 moles of octyl ether. If it is assumed that this catalyst is a complex of platinum, chlorine, octyl ether and octyl aldehyde with the hydrocarbon resin as an impurity and with there being 2 atoms of chlorine per atom of platinum and 2 moles octyl ether per mole of octyl aldehyde, these data would indicate that, disregarding the hydrocarbon resin, the active catalyst contained 11.5 percent chlorine, 29.4 percent platinum, 46.2 percent octyl ether and 12.9 percent octyl aldehyde as compared with the theoretical values of 10.3 percent chlorine, 29.0 percent platinum, 48.0 percent octyl ether and 12.7 percent octyl aldehyde.

*Example 21*

Chloroplatinic acid was dissolved in octyl alcohol in the ratio of 1 mole of chloroplatinic acid hexahydrate for 2 moles of octyl alcohol. This reaction mixture was then heated to a temperature of 70° C. and maintained at a pressure of 25 millimeters for 16 hours, during which time hydrogen chloride and water were evaporated and a precipitate formed. At the end of this time, the pressure was reduced to 2 millimeters and the reaction mixture was maintained at 70° C. for an additional hour to remove unreacted octyl alcohol. The reaction mixture was then allowed to cool to room temperature and a precipitate was removed. The filtrate was a catalyst within the scope of the present invention having a ratio of about 2 atoms of chlorine per atom of platinum. This material was a dark brown, viscous liquid.

*Example 22*

Octyl ether and chloroplatinic acid were mixed in the ratio of 2 moles of octyl ether per mole of chloroplatinic acid hexahydrate and the reaction mixture was heated at 60° C. for one hour to form a uniform solution. The temperature was then raised to 70° C. and the pressure reduced to 25 millimeters and the reaction mixture was maintained under these conditions for 20 hours, during which time hydrogen chloride and water were evaporated. At the end of this time, the pressure was reduced to 2 millimeters. A small portion of volatile material was removed. The reaction mixture was then cooled to room temperature and filtered to produce a viscous brown liquid catalyst within the scope of the present invention. Chemical analysis of this material showed the presence of 8.4 percent chlorine, 19.6 percent platinum, 55.94 percent carbon, 10.16 percent hydrogen and 7.74 percent oxygen which corresponds to a ratio of about 2.4 chlorine atoms per platinum atom. Following the procedure of Example 20, hydrogen was bubbled through a portion of this reaction mixture to precipitate platinum and the resulting filtrate showed a ratio of 1 mole of octyl aldehyde per 2 moles of ether.

*Example 23*

A mixture of ingredients in the ratio of 3 moles of octyl aldehyde and 1 mole of chloroplatinic acid hexahydrate was heated at 60° C. for 2 hours until a uniform solution was obtained. The reaction mixture was then heated at 70° C. under a pressure of 20 millimeters for 30 hours, during which time water and hydrogen chloride were removed from the reaction mixture. At the end of this time, the pressure on the system was reduced to 1 millimeter and the temperature was maintained at 70° C. for two additional hours to remove unreacted octyl aldehyde. The resulting material was filtered to produce a very viscous dark brown product which contained an average of about 2.3 chlorine atoms per platinum atom.

*Example 24*

A mixture was prepared in the ratio of 2 moles octyl aldehyde, 2 moles of octyl ether and 1 mole of chloroplatinic acid hexahydrate and heated at 55° C. for 3 hours to form a uniform solution. The solution was then heated at a temperature of 75° C. at a pressure of 30 millimeters for 24 hours, during which time water and hydrogen chloride were evaporated. The pressure was then reduced to 2 millimeters and unreacted volatiles were evaporated. The resulting product was filtered to yield a filtrate which was a dark brown liquid and which contained a ratio of about 2.2 chlorine atoms per platinum atom.

*Example 25*

A solution was formed by mixing ingredients in the ratio of 2 moles of butyl alcohol and 1 mole of chloroplatinic acid hexahydrate and maintained at a temperature of 65° C. and a pressure of 25 millimeters for 24 hours, during which time water and hydrogen chloride evaporated. At the end of this time, the temperature was increased to 75° C. and the pressure reduced to 5 millimeters and the butyl alcohol was evaporated. This resulted in a liquid containing some precipitate. The precipitate was removed and the filtrate was a light brown, viscous liquid having a ratio of 2.5 chlorine atoms per platinum atom.

*Example 26*

In order to demonstrate the effectiveness of the catalysts prepared in Examples 20 through 25, each of the catalysts was dissolved in sufficient toluene to provide 1950 parts platinum per million parts of toluene solution. A sufficient amount of each resulting catalyst solution was added to a polysiloxane mixture to provide 1 platinum atom per 10,000 vinyl groups in the polysiloxane mixture and maintained at a temperature of 120° C. The polysiloxane mixture was prepared by mixing 50 parts of the methylvinylpolysiloxane solution of Example 2, which contained 0.3 mole percent methylvinylsiloxane units, with 6 parts of the methyl hydrogen polysiloxane of Example 2, which contained 2.5 mole percent methyl hydrogen siloxane units. At the end of 15 minutes, each of the catalyzed mixtures had been converted to a soft, rubbery polymer.

*Example 27*

A portion of the catalyst of Example 21 was dissolved in toluene to provide a solution containing 1950 parts of catalyst per million parts of solution and was added in sufficient amount to a mixture of vinyl acetate and methyldichlorosilane to provide 1 atom of platinum per 50,000 atoms of vinyl acetate. The vinyl acetate-methyldichlorosilane mixture had been prepared by mixing 65 parts of vinyl acetate with 42 parts methyldichlorosilane. After maintaining this reaction mixture at reflux temperature for 3 hours, a substantially quantitative yield of methylacetoxyethyldichlorosilane had been formed.

While the foregoing examples have illustrated many of the embodiments of the present invention, it should be understood that the present invention is directed to a broad class of catalyst materials which are prepared by effecting reaction between chloroplatinic acid, either in the anhydrous form or in the form of the hexahydrate, with any of the alcohols, ethers or aldehydes previously discussed. These catalyst compositions are characterized by containing from 2.0 to 3.5 chlorine atoms per platinum atom. These catalysts can be used as solutions in other organic solvents.

The catalysts of the present invention have been illustrated in their use for the addition of various types of silicon-hydrogen compounds to various types of compounds containing a pair of aliphatic carbon atoms linked by multiple bonds. These multiple bonds can be either olefinic or acetylinic double bonds. While a great many of each of the types of reactants have been specifically illustrated it should be understood that the catalysts of the present invention are applicable to the very broad class of addition reactions previously described.

The products prepared by the addition reaction of the present invention have various utilities, depending on the particular product formed. Thus, the products formed from a monomeric silane containing a silicon-bonded hydrogen atom and silicon-bonded hydrolyzable groups and olefinic material such as, for example, the product prepared by adding methyldichlorosilane to cyclohexene may be hydrolyzed and condensed in conventional fashion to a form in various types of polysiloxanes. Similarly, the products prepared by reacting an organopolysiloxane containing silicon-bonded hydrogen groups with an organopolysiloxane containing silicon-bonded unsaturated groups can be used in the conventional silicone polymer applications. Thus, it is entirely possible to prepare these "addition polymers" in any shape desired in the unsupported state or in the supported state. Thus, these materials which are rubbery polymers can be used as gaskets and the like similar to conventional silicone rubbers. Those materials which are resinous in nature can be formed as insulation on insulated electrical conductors and the conductors can be used for conventional applications. Those monomeric materials prepared by the addition reaction of the present invention are obviously valuable as intermediates in the preparation of more complicated products.

What I claim as new and desire to secure by Letters Patent of the United States is:

1. A compound prepared by (A) forming a reaction mixture of (1) chloroplatinic acid with (2) at least 2 moles per gram atom of platinum of a member selected from the class consisting of (a) alcohols having the formula ROH, (b) ethers having the formula ROR, (c) aldehydes having the formula RCHO, and (d) mixtures thereof and (B) heating said reaction mixture at a temperature of from about 60 to 80° C. at a reduced pressure until the reaction product has a ratio of from about 2.0 to about 3.5 atoms of chlorine per atom of platinum, where R is a member selected from the class consisting of alkyl radicals containing at least 4 carbon atoms, alkyl radicals substituted with an aromatic hydrocarbon radical and alkyl radicals substituted with an OR' group, where R' is a member selected from the class consisting of monovalent hydrocarbon radicals free of aliphatic unsaturation and monovalent radicals free of aliphatic unsaturation and consisting of carbon, hydrogen and oxygen atoms with each oxygen atom being attached to two other atoms, one of which is a carbon atom and the other of which is a member selected from the class consisting of a carbon atom and a hydrogen atom.

2. A process for the production of organosilicon compositions containing carbon-silicon bonds which comprises contacting a silicon compound containing at least one hydrogen atom attached to silicon per molecule, there being not more than 2 hydrogen atoms attached to any one silicon atom, with a compound containing aliphatic carbon atoms linked by multiple bonds in the presence of a compound prepared by the process of claim 1.

3. A process for production of organosilicon compositions containing carbon-silicon linkages which comprises contacting a silicon compound having the formula:

$$(Z)_a Si(H)_b (X)_{4-a-b}$$

with a compound containing aliphatic carbon atoms linked by multiple bonds in the presence of the compound of claim 1, where X is a member selected from the class consisting of halogen atoms, —OZ radicals and —OOCZ radicals, where Z is a member selected from the class consisting of monovalent hydrocarbon radicals, halogenated monovalent hydrocarbon radicals and cyanoalkyl radicals, $a$ has a value of from 0 to 3, inclusive, and $b$ has a value of from 1 to 2, inclusive, and the sum of $a$ plus $b$ equals from 1 to 4, inclusive.

4. A process for the production of organosilicon compositions containing carbon-silicon linkages comprising contacting a silicon compound having the formula:

$$(Z)_a Si(H)_b (X)_{4-a-b}$$

with an organosilicon compound having the formula:

$$(Y)_m (Y')_n SiX_{4-m-n}$$

in the presence of a compound prepared by the process of claim 1, where X is a member selected from the class consisting of halogen atoms, —OZ radicals and —OOCZ radicals, where Z and Y are members selected from the class consisting of monovalent hydrocarbon radicals, halogenated monovalent hydrocarbon radicals and cyanoalkyl radicals, Y' is an organic radical containing at least one pair of aliphatic carbon atoms attached by multiple bonds, $a$ has a value of from 0 to 3, inclusive, $b$ has a value of from 1 to 2, inclusive, the sum of $a$ plus $b$ is equal to from 1 to 4, inclusive, $m$ has a value of from 0 to 3, inclusive, $n$ has a value of from 1 to 4, inclusive, and the sum of $m+n$ is equal to form 1 to 4, inclusive.

5. A process for the production of organosilicon compounds containing carbon-silicon linkages comprising contacting an organopolysiloxane having the formula:

$$(Z)_e Si(H)_f O_{\frac{4-e-f}{2}}$$

with a compound containing aliphatic carbon atoms linked by multiple bonds in the presence of a compound prepared by the process of claim 1, where Z is a member selected from the class consisting of monovalent hydrocarbon radicals, halogenated monovalent hydrocarbon radicals and cyanoalkyl radicals, $e$ has a value of from 0.5 to 2.49, inclusive, $f$ has a value of from 0.001 to 1.0, inclusive, and the sum of $e+f$ is equal to from 1.0 to 2.5, inclusive.

6. A process for the production of a polymeric organopolysiloxane containing carbon to silicon bonds comprising contacting an organopolysiloxane having the formula $$(Z)_e Si(H)_f O_{4-e-f}$$

with an organopolysiloxane having the formula:

$$(Y)_e (Y')_f SiO_{4-e-f}$$

in the presence of a catalyst compound prepared by the method of claim 1, where Z and Y are members selected from the class consisting of monovalent hydrocarbon radicals, halogenated monovalent hydrocarbon radicals and cyanoalkyl radicals, Y' is an organic radical containing aliphatic carbon atoms linked by multiple bonds, $e$ has a value of from 0.5 to 2.49, inclusive, $f$ has a value of from 0.001 to 1.0, inclusive, and the sum of $e+f$ is equal to form 1.0 to 2.5, inclusive.

7. A compound prepared by (A) forming a reaction mixture of (1) chloroplatinic acid with (2) at least 2 mols of octyl alcohol per gram atom of platinum and (B) heating said reaction mixture at a temperature of from about 60 to 80° C. at a reduced pressure until the reaction product has a ratio of from about 2.0 to about 3.5 atoms of chlorine per atom of platinum.

8. A process for the production of organosilicon compositions containing carbon-silicon bonds which comprises contacting a silicon compound containing at least one hydrogen atom attached to silicon per molecule, there being not more than 2 hydrogen atoms attached to any one silicon atom, with a compound containing aliphatic carbon atoms linked by multiple bonds in the presence of a compound prepared by the process of claim 7.

9. A compound prepared by (A) forming a reaction mixture of (1) chloroplatinic acid with (2) at least 2 mols of dioctyl ether per gram atom of platinum and (B) heating said reaction mixture at a temperature of from about 60 to 80° C. at a reduced pressure until the reaction product has a ratio of from about 2.0 to about 3.5 atoms of chlorine per atom of platinum.

10. A process for the production of organosilicon compositions containing carbon-silicon bonds which comprises contacting a silicon compound containing at least one hydrogen atom attached to silicon per molecule, there being not more than 2 hydrogen atoms attached to any one silicon atom, with a compound containing aliphatic carbon atoms linked by multiple bonds in the presence of a compound prepared by the process of claim 9.

11. A compound prepared by (A) forming a reaction mixture of (1) chloroplatinic acid with (2) at least 2 mols of octyl aldehyde per gram atom of platinum and (B) heating said reaction mixture at a temperature of from about 60 to 80° C. at a reduced pressure until the reaction product has a ratio of from about 2.0 to about 3.5 atoms of chlorine per atom of platinum.

12. A process for the production of organosilicon compositions containing carbon-silicon bonds which comprises contacting a silicon compound containing at least one hydrogen atom attached to silicon per molecule, there being not more than 2 hydrogen atoms attached to any one silicon atom, with a compound containing aliphatic carbon atoms linked by multiple bonds in the presence of a compound prepared by the process of claim 11.

References Cited by the Examiner

UNITED STATES PATENTS

| | | | |
|---|---|---|---|
| 2,823,218 | 2/1958 | Speier et al. | 260—46.5 |
| 2,915,497 | 12/1959 | Clark | 260—46.5 |
| 2,954,390 | 9/1960 | Pike et al. | 260—46.5 |
| 2,970,150 | 1/1961 | Bailey | 260—448.2 |

OTHER REFERENCES

Kharasch et al.: Journal American Chemical Society, volume 58 (1936), page 1734.

LEON J. BERCOVITZ, *Primary Examiner.*

WILLIAM H. SHORT, MURRY TILLMAN, DONALD E. CZAJA, *Examiners.*